H. H. BOYCE.
INDICATING MEANS FOR MOTOR PROPELLED VEHICLES.
APPLICATION FILED OCT. 17, 1912.
1,275,654.
Patented Aug. 13, 1918.
2 SHEETS—SHEET 2.
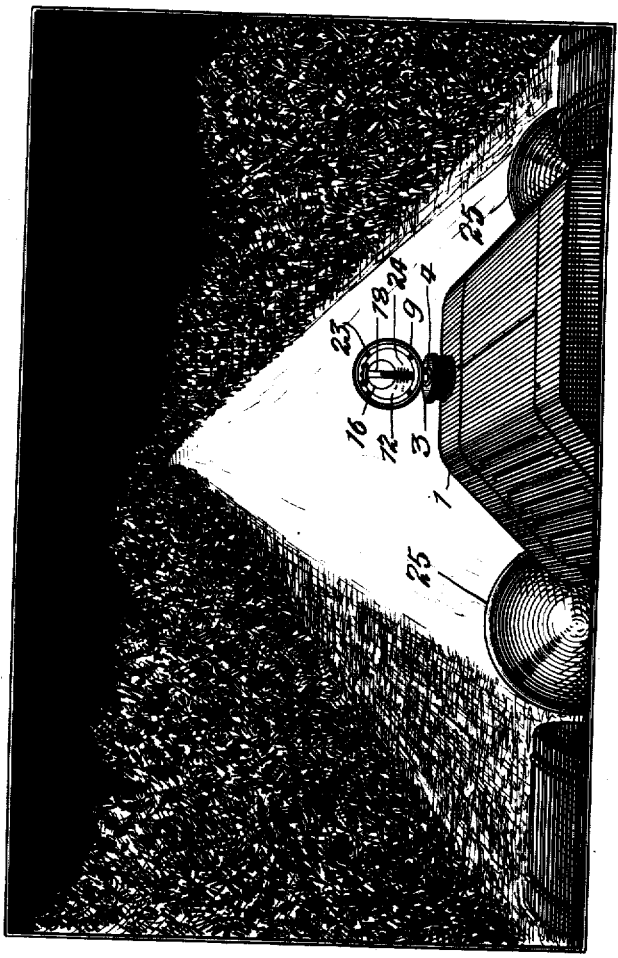

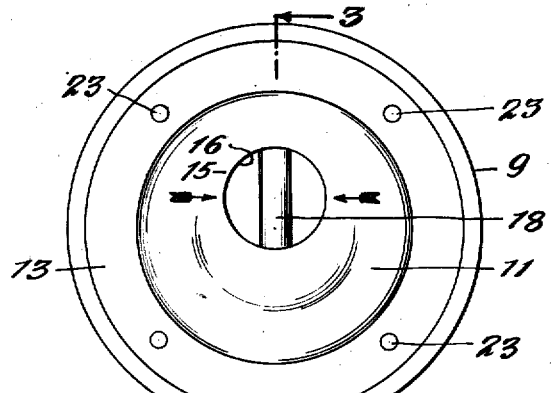
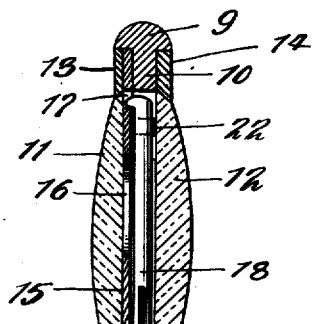
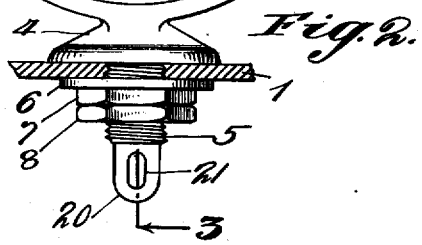
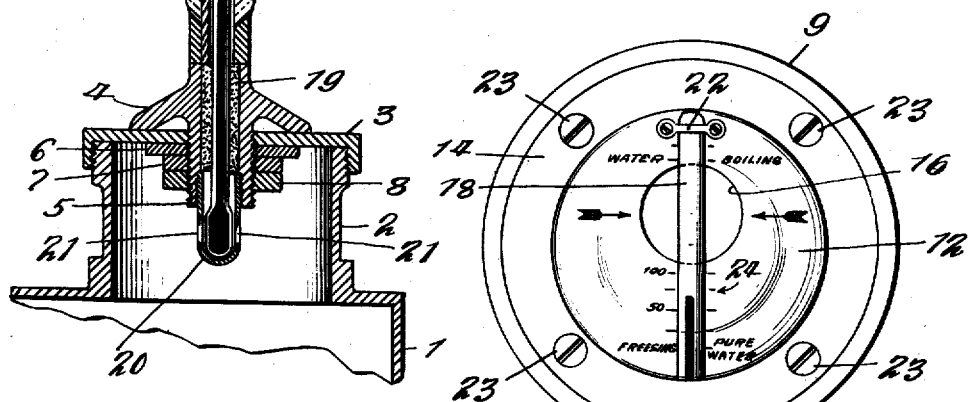
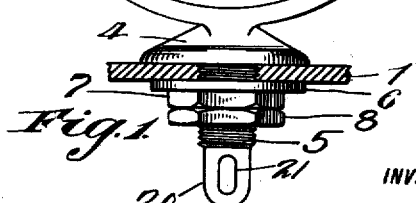

UNITED STATES PATENT OFFICE.

HARRISON HURLBERT BOYCE, OF OYSTER BAY, NEW YORK.

INDICATING MEANS FOR MOTOR-PROPELLED VEHICLES.

1,275,654.   Specification of Letters Patent.   Patented Aug. 13, 1918.

Application filed October 17, 1912.   Serial No. 726,270.

*To all whom it may concern:*

Be it known that I, HARRISON HURLBERT BOYCE, a citizen of the United States, residing at Oyster Bay, in the county of Nassau and State of New York, have invented certain new and useful Improvements in Indicating Means for Motor-Propelled Vehicles, of which the following, taken in connection with the accompanying sheets of drawings, forms a complete and concise description.

My present invention relates to indicating means associated with a motor propelled vehicle, devised for the purpose of showing when trouble or abnormal conditions exist in the power plant thereof, whether such conditions result from overheating, or from the temperature of the engine or its cooling system being too low for safe or satisfactory operation. Too high a temperature of the engine or power plant may result from various causes such as defective lubrication, lack of oil, lack of water in the cooling system, insufficient cooling capacity of the cooling system, overloading of the motor, breaking of the fan belt, or improper adjustment of the carbureter, and is dangerous, as it may result in serious accident, or injury to the motor, such as the "seizing" of the pistons, in the cylinders, scoring or cracking of the cylinders, or other harm to the mechanism. In most instances continued operation of the motor is prevented, and in some cases the motor may be entirely ruined. Too low a temperature of the motor is also most undesirable as it does not permit efficient or economical operation, and may prevent proper carburation and combustion, resulting in the motor missing with consequent loss of power, in fact sometimes rendering continued operation of the motor altogether impossible. There is also danger in cold weather of the water in the cooling system, especially the pump, or radiator becoming frozen, thus preventing circulation and affording no protection against unexpected immediate and dangerous overheating of the engine.

The principal object, therefore, of my present invention is to provide means which may be organized in connection with the power plant of a motor driven vehicle for indicating to the driver of the vehicle at all times the working condition of the engine and for rendering it possible for him to ascertain the existence of abnormal, and especially dangerous and possibly destructive thermal conditions of the engine, which means by reason of the construction and arrangement thereof, may be easily read by the driver of the machine from his seat, obviating the necessity of close inspection to determine the existence of such abnormal conditions.

A more specific object of the invention which is accomplished by the form of the invention particularly described and illustrated herein, relates to the provision of an instrument of the character above indicated mounted on the radiator of the vehicle substantially in the line of vision of the driver while driving, whereby enabling the driver to observe the instrument and keep himself informed as to the conditions of operation of the engine without requiring him to divert his attention from the operation of driving.

Referring to the accompanying drawings in which I have illustrated one preferred embodiment of my invention, I will proceed to describe this form, having it understood that I do not wish to be restricted in the matter of details, as the same may be altered or varied without departing from the spirit of the invention.

Figure 1 is a view of a preferred embodiment of my invention, showing the face of the instrument visible from the driver's seat of the automobile.

Fig. 2 is a view of the reverse side of the instrument.

Fig. 3 is a vertical sectional view, taken on line 3—3 of Fig. 2, showing the same attached to a radiator cap, and a fragmentary portion of the radiator.

Fig. 4 is a view of the indicator attached to an automobile and shows the manner in which the indicating thermometer is thrown into relief and made visible at night by the illumination of the head lamps of the machine.

Referring in detail to these drawings, the numeral 1 indicates the radiator of an automobile, 2 the water inlet therefor, 3 the cap to the radiator inlet 2, detachably secured to which is the indicator by means of an integral annular flange 4, and a screw-threaded protuberance 5, washer 6, and lock-nuts 7 and 8. The body or frame portion of the indicator with which the flange 4 is integrally formed is indicated by the numeral 9, the same being annular in form, and is provided with an interiorly-extending portion 10, which serves to support the crystals and retaining rings when assembled. The crystals are indicated by the numerals 11 and 12, and the retaining rings by the numerals 13 and 14. 15 indicates a disk-plate provided with a sight-opening 16, and a relatively smaller opening 17, for the accommodation of the projecting end or teat of the tube of the thermometer 18. The thermometer 18 is positioned centrally of the device and is supported in, but thermally insulated from, the frame of the device by a concrete or other non-conducting filling 19. The lower or bottom portion of the thermometer extends well below the cap 3 of the radiator, this portion being protected by a metallic thimble or cap 20, which is provided with a plurality of perforations or holes 21. The upper portion of the thermometer is fastened and held securely to the plate 17 by means of a strap 22, the plate 15, crystals 11 and 12, retaining rings 13, and frame 9 being all securely held together in assembled relation by means of suitable screws 23. The crystals 11 and 12, if desired, may be magnifying crystals, enlarging the appearance of the thermometer in order that it may be more easily observed and read from the seat of the car. The plate 15 is positioned to the rear of the thermometer 2, and its front face is provided with suitable graduations 24, to indicate the degree of rise and fall of the mercury within the tube. The scale or graduations serve to indicate approximately the temperature of the water in the radiator, thereby constituting a guide for the operator in driving the motor at proper temperatures under normal working conditions, while the sight-opening 16 serves the purpose of permitting the detection, by the occupant of the car, of any abnormal rise in the temperature which would indicate that the engine was running hot, whether in the daytime or at night, in the latter instance the illumination of the headlight 25 of the machine serving to throw into relief the mercury within the thermometer, which is greatly magnified by the lens or crystal 11, as more particularly shown in Fig. 4.

Having thus described my invention, what I claim as new herein and desire to secure by Letters Patent is:

1. An indicator adapted to be attached to the radiator of an automobile, comprising movable indicating means influenced by varying conditions of the water within the radiator, a dial provided with scale indications for indicating the movement of the indicating means, said dial being provided with a sight-opening, and crystals in front and rear of said dial-plate and indicating means.

2. A device of the character described, comprising a thermometer, an annular casing therefor composed of a ring provided with a securing portion for attachment to an automobile radiator, a dial-plate provided with suitable scale graduations and having a sight-aperture positioned adjacent the thermometer, a lens in front and rear of the said dial-plate and thermometer, means for securing the said dial-plate and thermometer and lenses to the ring, and insulating composition between the said ring and the thermometer, and a protecting thimble or cap surrounding the lower portion of the thermometer and connected to the securing portion of the ring.

3. In a device of the character described, comprising a thermometer, a casing therefor comprising an annular body portion provided with means for attachment to the cap of an automobile radiator, an apertured annular dial-plate having graduated indications thereon, a pair of magnifying lenses at the front and rear of the dial-plate and thermometer, and securing rings engaging the peripheral edge of the lens and secured to the body portion, a cement-like insulating material between the thermometer and the body portion and insulating the same therefrom, and a protecting thimble or cap surrounding the lower portion of the thermometer and having screw-threaded connection with the body portion.

4. Means for indicating the thermal condition of the engine of an automobile having an internal combustion engine provided with a liquid circulation cooling system, comprising the combination with the cooling system, of an indicating device having an indicating part readable from the driver's seat of the automobile, and having a temperature responsive element located in a position to be influenced by changes of temperature within the cooling system.

5. Means for indicating the thermal condition of the engine of an automobile provided with a liquid circulation cooling system including a radiator, comprising the combination with the radiator, of an indicating device mounted thereon having an indicating part readable from the driver's seat of the automobile and a temperature responsive part so located as to be influenced by the temperature within the radiator.

6. Means for indicating the thermal condition of the engine of an automobile having an internal combustion engine provided with a liquid circulation cooling system including a radiator having a filler spout closed by a cap, comprising the combination with the radiator and cap, of a thermometer mounted on said cap and so constructed as to be readable from the driver's seat of the automobile, the temperature responsive element of said thermometer projecting through said cap into a position to be influenced by temperatures within the radiator.

7. The combination with a cap for an automobile radiator, of an instrument mounted thereon for indicating temperature change, said instrument having a temperature responsive part projecting below the radiator cap and an indicating part projecting above the radiator cap and of such a character that a temperature change indication thereof is visible from the driver's seat of the automobile.

8. In an instrument for indicating abnormal thermal conditions of the engine of an automobile, an indicating element, and a dial plate associated therewith, said dial plate having an aperture therethrough substantially coinciding with the zone of danger indication of said indicating element.

9. In an instrument for indicating abnormal thermal conditions of the engine of an automobile and adapted to be mounted upon the radiator of the automobile, the combination with the indicating element of the instrument, of a dial plate associated therewith having an aperture therethrough permitting substantially uninterrupted vision through said instrument.

10. In an instrument for indicating the thermal condition of an automobile engine, and adapted to be mounted upon the top of the radiator of said engine, the combination of a supporting frame, an apertured backing plate carried by said frame and an indicating element carried by said frame in front of said backing plate and adapted to pass across or in front of said aperture under certain thermal conditions, vision through said aperture being substantially unobstructed except by the passage of said indicating element across the same.

11. In an instrument for indicating the thermal condition of the engine of an automobile, the combination of a frame adapted to be mounted on the top of the radiator of the automobile, a glass tube thermometer carried by said frame, the tube portion of the thermometer extending above the top of the radiator, said frame having a backing plate located back of said tube, said backing plate having an aperture therethrough across which said tube passes, vision through said aperture being substantially unobstructed except by the indicating liquid in said tube, when said liquid rises in the tube to the height of the aperture.

12. In an instrument for indicating the thermal condition of the engine of an automobile, the combination of a frame adapted to be mounted upon the cap of the radiator of the automobile engine, a glass tube thermometer carried by said frame with the tube portion thereof projecting above said radiator cap, a portion of said frame forming a guard or protector for said tube, crystals carried by said frame in front and rear of said tube, and a backing plate carried by said frame in rear of said tube and having an aperture therethrough across which said tube passes, the bulb portion of said thermometer projecting below said radiator cap into the radiator.

13. In an instrument for indicating the thermal condition of the engine of an automobile, the combination with a temperature indicating element, of a backing plate across which the same moves when indicating dangerous thermal conditions, said backing plate having a contrasting danger zone indication of such extent and so located as to correspond substantially with the range of movement of the indicating element when indicating danger, whereby danger-indicating positions of the indicating element are made easily noticeable.

14. The combination with a cap for the filler spout of an automobile radiator, of a frame mounted on said cap and having a glass tube thermometer mounted therein with its bulb adapted to project into the radiator, the tube part of the thermometer projecting partly above said cap, a portion of said frame forming a guard for protecting said projecting part of the thermometer against breakage, said frame being open at the front and rear to permit vision through the instrument.

15. The combination with an automobile radiator, of an instrument mounted thereon for indicating thermal conditions in the radiator, said instrument including temperature indicating means and a protective casing therefor, said casing being at least partly open in both front and rear to permit vision through the instrument.

16. The combination with an automobile radiator, of an instrument mounted thereon for indicating thermal conditions in the radiator, said instrument including a glass tube thermometer, the bulb of which projects into the radiator and a portion of the tube of which projects above the top of the radiator, and a protective casing therefor inclosing the projecting portion of the thermometer tube, said casing being formed of metal with a window of transparent material in front of said thermometer tube and facing in the direction of the driver of the automobile, the thermometer being of a character to be readily observed by the driver when operating the automobile.

17. In an instrument adapted to be mounted on an automobile radiator, the combination with a frame or casing, of flat shape, wider than its thickness, means for securing the same edgewise upon a radiator in a plane substantially vertical and at right angles to the axis of the automobile, temperature change indicating means carried by said frame and including a temperature responsive part projecting into the radiator, and reference indicia for assisting in the observation of the temperature change indication carried by said frame.

18. In an instrument adapted to be mounted on an automobile radiator, the combination of a frame of greater width than thickness, having a transverse opening therethrough in the direction of its thickness, means for securing the frame edgewise upon the radiator in a plane substantially vertical and at right angles to the axis of the automobile, and a temperature change indicating means carried by said frame including a temperature responsive element projecting into the radiator and having a glass tube crossing the opening in said frame, and means carried by the frame bearing indicia for assisting in the observation of temperature change indication, said indicia being arranged at opposite sides of said glass tube.

19. In an instrument adapted to be mounted on an automobile radiator, the combination with a frame or casing of annular form, much thinner than its diameter, means for securing the said frame edgewise upon the radiator in a plane substantially vertical and at right angles to the axis of the automobile, a temperature change indicating device carried by said frame and including a temperature responsive element projecting into the radiator, and a temperature indicating part extending across the frame and a circular dial plate of substantially the outlines of said frame attached to said frame in the rear of said temperature indicating means.

20. In an instrument adapted to be mounted on an automobile radiator, the combination with a frame or casing of annular form and thinner than its diameter, means for securing the same edgewise upon the radiator in a plane substantially vertical and at right angles to the axis of the automobile, a glass tube thermometer carried by said frame and having a bulb projecting into the radiator, and a tube extending substantially diametrically across said frame, and circular crystals attached to the said frame in front and rear of said tube.

21. In an instrument adapted to be mounted on an automobile radiator, the combination of a frame or casing of annular form, means for securing the same edgewise upon the radiator in a plane substantially vertical and at right angles to the axis of the automobile, a circular dial plate carried by said frame, a thermometer carried by said frame and extending across the same in front of said dial plate, the bulb of said thermometer being adapted to project into the radiator, and crystals inclosing said dial plate and thermometer.

22. In an instrument adapted to be mounted on an automobile radiator, the combination of a frame or casing having a circular opening therethrough, annular countersinks formed around said opening, circular crystals, annular retaining rings fitting in said countersinks and securing said crystals upon opposite sides of said frame, and temperature indicating means inclosed between said crystals and a temperature responsive element controlling said temperature indicating means and being adapted to project into the radiator.

23. In an instrument adapted to be mounted on an automobile radiator, the combination of a frame or casing having a circular opening therethrough and an annular countersink surrounding said opening, means for securing said frame edgewise upon the radiator in a plane substantially vertical and at right angles to the axis of the automobile, a thermometer mounted on said frame and having its tube crossing said circular opening substantially diametrically and a circular dial plate mounted in said countersink in rear of said thermometer tube, the bulb of said thermometer projecting into the radiator.

24. In an instrument adapted to be mounted on an automobile radiator, the combination of a frame or casing having a circular opening therethrough and annular countersinks surrounding said opening, means for securing said frame edgewise upon the radiator in a plane substantially vertical and at right angles to the axis of the automobile, a thermometer carried by said frame and having its tube extending substantially diametrically across said opening and its bulb projecting into the radiator, a dial plate mounted in one of said countersinks in the rear of said thermometer tube, crystals inclosing said thermometer tube and dial plate and annular retaining rings for said crystals.

25. In combination with a vehicle, having an internal combustion propelling motor, a fluid containing means associated therewith so as to be influenced by temperatures of the motor structure and means for showing normal and undesirable conditions of the power-plant, comprising a part mounted in temperature-responsive relationship to the fluid-containing means to be controlled by the changes in the temperature of said motor structure, and a sight indicator part associated with said first mentioned part, adapted to be affected by the changing temperature conditions of the latter and located to be read by the operator of the vehicle while driving the same, said indicator part being adapted to present varying indications normally to serve as a guide for the operator in driving the motor at proper temperatures and abnormally as a warning to prevent or overcome undesirable conditions in the power plant.

In witness whereof I have hereunto set my hand in the presence of two subscribing witnesses.

HARRISON HURLBERT BOYCE.

Witnesses:
CHAS. LYON RUSSELL,
WM. C. DUNN.

DISCLAIMER 1,275,654.—*Harrison Hurlbert Boyce*, Oyster Bay, N. Y. INDICATING MEANS FOR MOTOR-PROPELLED VEHICLES. Patent dated August 13, 1918. Disclaimer filed May 13, 1932, by the patentee, said *Boyce, Leander Development Corporation*, a party of interest, and *Moto Meter Gauge & Equipment Corporation*, exclusive licensee, assenting.

Hereby enters this disclaimer to claims 4 and 25 of said patent, which are in the following words, to wit:

"4. Means for indicating the thermal condition of the engine of an automobile having an internal combustion engine provided with a liquid circulation cooling system, comprising the combination with the cooling system, of an indicating device having an indicating part readable from the driver's seat of the automobile, and having a temperature responsive element located in a position to be influenced by changes of temperature within the cooling system."

"25. In combination with a vehicle, having an internal combustion propelling motor, a fluid containing means associated therewith so as to be influenced by temperatures of the motor structure and means for showing normal and undesirable conditions of the power-plant, comprising a part mounted in temperature-responsive relationship to the fluid-containing means to be controlled by the changes in the temperature of said motor structure, and a sight indicator part associated with said first mentioned part, adapted to be affected by the changing temperature conditions of the latter and located to be read by the operator of the vehicle while driving the same, said indicator part being adapted to present varying indications normally to serve as a guide for the operator in driving the motor at proper temperatures and abnormally as a warning to prevent or overcome undesirable conditions in the power plant."

[*Official Gazette May 31, 1932.*]